(12) United States Patent
Sumioka et al.

(10) Patent No.: US 9,992,536 B2
(45) Date of Patent: Jun. 5, 2018

(54) INFORMATION PROVISION DEVICE, INFORMATION PROVISION METHOD, AND INFORMATION PROVISION SYSTEM

(71) Applicant: FUJITSU LIMITED, Kawasaki-shi, Kanagawa (JP)

(72) Inventors: Motoshi Sumioka, Kawasaki (JP); Kazuo Sasaki, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 669 days.

(21) Appl. No.: 14/299,542

(22) Filed: Jun. 9, 2014

(65) Prior Publication Data

US 2015/0032240 A1 Jan. 29, 2015

(30) Foreign Application Priority Data

Jul. 23, 2013 (JP) ................ 2013-152473

(51) Int. Cl.
| | | |
|---|---|---|
| *G06F 17/00* | (2006.01) | |
| *H04N 21/442* | (2011.01) | |
| *G06F 17/30* | (2006.01) | |
| *H04N 21/45* | (2011.01) | |
| *H04N 21/81* | (2011.01) | |
| *H04L 29/08* | (2006.01) | |
| *H04W 4/02* | (2018.01) | |

(52) U.S. Cl.
CPC . *H04N 21/44204* (2013.01); *G06F 17/30761* (2013.01); *H04L 67/18* (2013.01); *H04N 21/44218* (2013.01); *H04N 21/44222* (2013.01); *H04N 21/4532* (2013.01); *H04N 21/8106* (2013.01); *H04L 67/22* (2013.01); *H04W 4/02* (2013.01)

(58) Field of Classification Search
CPC ... G06F 17/30761; H04L 67/18; H04L 67/22; H04N 21/44204; H04N 21/44218; H04N 21/44222; H04N 21/4532; H04N 21/8106; H04W 4/02
USPC .......................................................... 700/94
See application file for complete search history.

(56) References Cited

U.S. PATENT DOCUMENTS

| | | | | |
|---|---|---|---|---|
| 5,701,162 | A | * 12/1997 | Choi | H04N 5/44513 348/553 |
| 2004/0172248 | A1 | 9/2004 | Otsuka et al. | |
| 2005/0080626 | A1 | 4/2005 | Marutmoto et al. | |
| 2006/0143012 | A1 | 6/2006 | Kimura et al. | |
| 2006/0212147 | A1* | 9/2006 | McGrath | H04L 12/1822 700/94 |

(Continued)

FOREIGN PATENT DOCUMENTS

| | | |
|---|---|---|
| JP | 10-124292 | 5/1998 |
| JP | 2002-023787 | 1/2002 |

(Continued)

*Primary Examiner* — Hemant Patel
(74) *Attorney, Agent, or Firm* — Staas & Halsey LLP

(57) ABSTRACT

An information provision device includes a processor; and a memory which stores a plurality of instructions, which when executed by the processor, cause the processor to execute, selecting a content corresponding to position information of a user from contents stored in a storage unit in advance; multiplexing the contents using a multiplex number that corresponds with familiarity of the user with the selected content; and providing the multiplexed contents to the user.

18 Claims, 18 Drawing Sheets

(56) References Cited

U.S. PATENT DOCUMENTS

2008/0177994 A1* 7/2008 Mayer .................. G06F 9/4418
713/2
2012/0002599 A1* 1/2012 Annavajjala .......... H04L 5/0023
370/328

FOREIGN PATENT DOCUMENTS

JP      2005-70430      3/2005
WO      WO0 03/085511   10/2003

* cited by examiner

FIG. 5A

| PERSON ID | SOUND ID | POSITION | TIME |
|---|---|---|---|
| a (GREENGROCER OWNER) | 001 | (120,350) | 3s |
| b (BANK EMPLOYEE) | 002 | (124,356) | 4s |
| C (BOX LUNCH SELLER) | 003 | (128,356) | 5s |
| d (WORKER) | 004 | (120,358) | 7s |
| ... | ... | ... | ... |

FIG. 5B

| USAGE ID | USER ID | SOUND ID | USAGE START TIME | CONTENT LENGTH | SOUND NUMBER |
|---|---|---|---|---|---|
| 1 | p01 | 002 | 20130512T10:00:00 | 4s | 0.56 |
| 2 | p01 | 001 | 20130512T10:00:02 | 3s | 0.72 |
| 3 | p01 | 004 | 20130512T10:00:03 | 7s | 0.7 |
| ... | ... | ... | ... | ... | ... |

FIG. 5C

| CUMULATIVE USAGE TIME | MAXIMUM MULTIPLEX NUMBER |
|---|---|
| LESS THAN ONE HOUR | 1 |
| LESS THAN SEVEN DAYS (168 HOURS) | 2 |
| SEVEN DAYS (168 HOURS) OR MORE | 3 |

FIG. 5D

| USER ID | NAME | CUMULATIVE USAGE TIME | FAMILIARITY WITH PERSON | FAMILIARITY WITH CONTENT | FAMILIARITY WITH LOCATION |
|---|---|---|---|---|---|
| p01 | TARO | 103 HOURS 14 MINUTES | PERSON CUMULATIVE INFORMATION | CONTENT CUMULATIVE INFORMATION | LOCATION CUMULATIVE INFORMATION |
| ... | ... | ... | ... | ... | ... |

FIG. 5E

| SOUND ID | URL | DETAILS |
|---|---|---|
| 001 | http://a.com/a.wav | WELCOME |
| 002 | file:///b/b.mp3 | NEW BILLS ARE AVAILABLE |
| 003 | sip:c@c.com | FRESHLY MADE BOX LUNCHES |
| 004 | rtsp://d.com/ddd | CAUTION, UNDER CONSTRUCTION |
| ... | ... | ... |

FIG. 6A

| PERSON ID | USAGE TIME |
|---|---|
| a (GREENGROCER OWNER) | 14 MINUTES |
| b (BANK EMPLOYEE) | 31 MINUTES |
| C (BOX LUNCH SELLER) | 2 MINUTES |
| d (WORKER) | 0 MINUTES |
| e (SYSTEM) | 1 HOUR 15 MINUTES |
| ... | ... |

FIG. 6B

| SOUND ID | NUMBER OF USES |
|---|---|
| 001 | 2 TIMES |
| 002 | 4 TIMES |
| 003 | 5 TIMES |
| 004 | 6 TIMES |
| 005 | 14 TIMES |
| ... | ... |

FIG. 6C

| LOCATION NAME | NUMBER OF VISITS |
|---|---|
| SHOPPING ARCADE A | 12 TIMES |
| AMUSEMENT PARK B | 2 TIMES |
| AMUSEMENT PARK C | 10 TIMES |
| SUPERMARKET D | 15 TIMES |
| HOME | 1500 TIMES |
| ... | ... |

FIG. 7A

| USAGE TIME | SOUND NUMBER |
|---|---|
| 10 MINUTES | 0.9 |
| 30 MINUTES | 0.8 |
| 1 HOUR | 0.7 |
| 3 HOURS | 0.6 |
| 8 HOURS OR MORE | 0.5 |

FIG. 7B

| NUMBER OF USES | SOUND NUMBER |
|---|---|
| 0 TIMES | 1.0 |
| 1 TIME | 0.9 |
| 2 TIMES | 0.8 |
| 4 TIMES | 0.7 |
| 8 TIMES | 0.6 |
| 16 TIMES OR MORE | 0.5 |

FIG. 7C

| NUMBER OF VISITS | SOUND NUMBER |
|---|---|
| 0 TIMES | 1.0 |
| 3 TIMES | 0.9 |
| 10 TIMES | 0.8 |
| 20 TIMES | 0.7 |
| 50 TIMES | 0.6 |
| 100 TIMES OR MORE | 0.5 |

FIG. 16

| PERSON ID | SOUND ID | POSITION | TIME | PRIORITY LEVEL |
|---|---|---|---|---|
| a (GREENGROCER OWNER) | 001 | (120,350) | 3s | LOW |
| b (BANK EMPLOYEE) | 002 | (124,356) | 4s | LOW |
| c (BOX LUNCH SELLER) | 003 | (128,356) | 5s | MEDIUM |
| d (WORKER) | 004 | (120,358) | 7s | HIGH |
| ... | ... | ... | ... | ... |

INFORMATION PROVISION DEVICE, INFORMATION PROVISION METHOD, AND INFORMATION PROVISION SYSTEM

CROSS-REFERENCE TO RELATED APPLICATION

This application is based upon and claims the benefit of priority of the prior Japanese Patent Application No. 2013-152473, filed on Jul. 23, 2013, the entire contents of which are incorporated herein by reference.

FIELD

The embodiments discussed herein are related to, for example, an information provision device, an information provision method, an information provision system, and an information provision program.

BACKGROUND

Information provision through contents, such as sounds, from numerous people, objects, services, and the like has been performed since the past. Sound is one-dimensional, time-series information. Therefore, when pieces of useful information are dispersed throughout a long passage, the user has to endure listening through uninteresting sections in wait for a piece of useful information to be played back.

In addition, in conventional information provision, a plurality of sounds are often multiplexed and outputted. However, when the plurality of sounds are simply multiplexed and outputted, the sounds are too overlapped and become indistinguishable. Therefore, for example, International Publication Pamphlet No. WO 2003/085511 discloses a technology in which a server delivers sound information and timing information, and sounds are outputted at timings that do not overlap. In addition, Japanese Laid-open Patent Publication No. 10-124292 discloses a method for simultaneously outputting a plurality of sounds that are localized in differing directions. Moreover, Japanese Laid-open Patent Publication No. 2002-023787 discloses a technology in which, when the playback timings of sounds overlap, the playback speed is increased depending on the number of sounds that are being played back and are awaiting playback. Furthermore, Japanese Laid-open Patent Publication No. 2005-070430 discusses a method for adjusting the sound pressure of words.

SUMMARY

In accordance with an aspect of the embodiments, an information provision device includes, a processor; and a memory which stores a plurality of instructions, which when executed by the processor, cause the processor to execute, selecting a content corresponding to position information of a user from contents stored in a storage unit in advance; multiplexing the contents using a multiplex number that corresponds with familiarity of the user with the selected content; and providing the multiplexed contents to the user.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIGS. 5A to 5E are diagrams of examples of various pieces of data used in the information processing system;

FIGS. 6A to 6C are diagrams of examples of pieces of cumulative information included in proficiency level information;

FIGS. 7A to 7C are diagrams of examples of sound number determination criteria;

FIG. 16 is a diagram of an example of data in a content index having priority levels.

DESCRIPTION OF EMBODIMENTS

Hereinafter, embodiments will be described with reference to the accompanying drawings.

<Example of an Overall Configuration of an Information Provision System According to a Present Embodiment>

Figure 1:
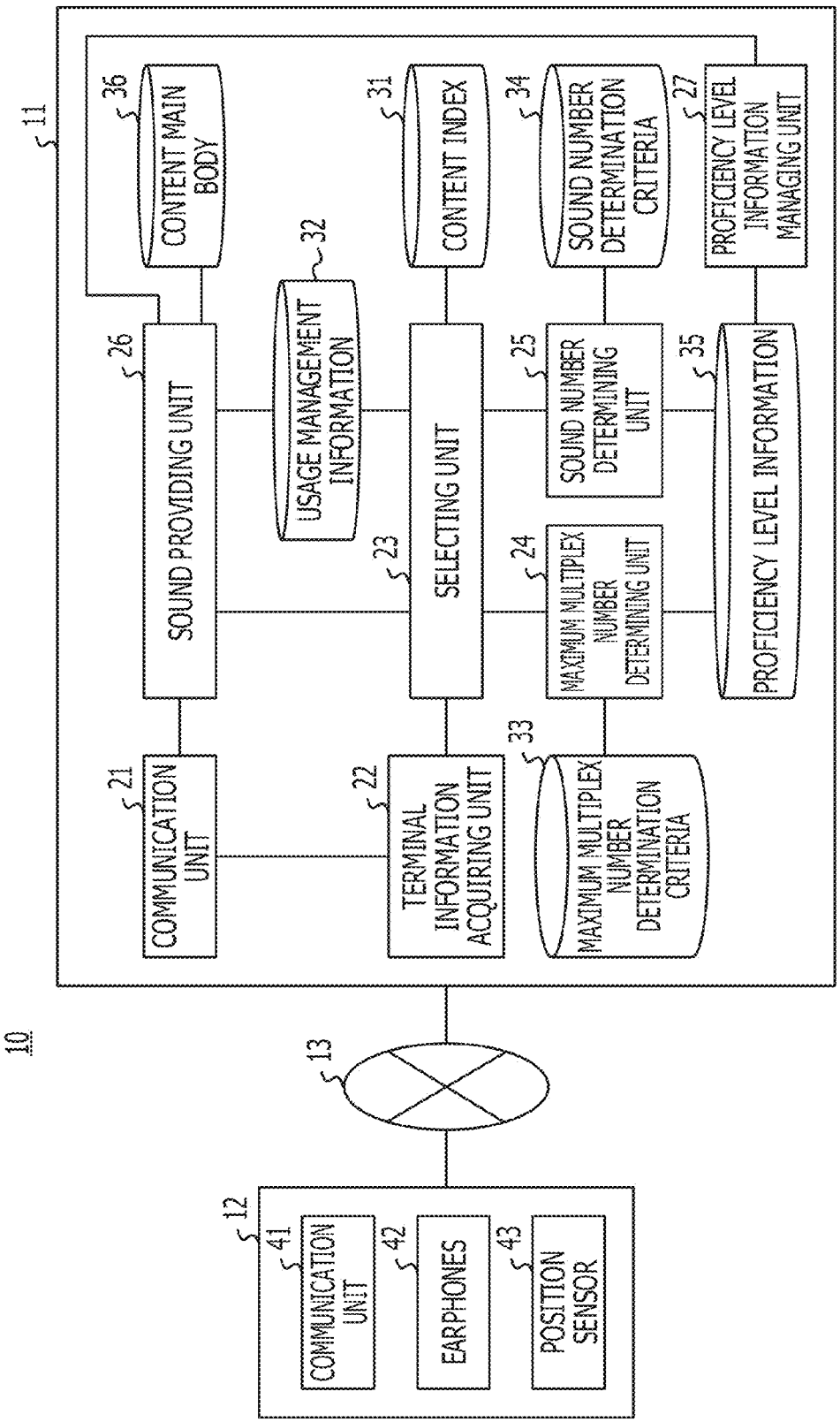
FIG. 1 is a diagram of an example of a configuration of an information provision system according to the present embodiment.

FIG. 1 is a diagram of an example of a configuration of an information provision system according to a present embodiment. An information provision system 10 illustrated in FIG. 1 is a system that provides sounds as an example of information (content) to be provided. However, the type of information to be provided is not limited to sounds. The information provision system 10 illustrated in FIG. 1 includes an information provision device 11 and a user terminal 12. The information provision device 11 and the user terminal 12 are connected by, for example, a communication network 13 so as to be capable of transmitting and receiving data. In the example illustrated in FIG. 1, the information provision device 11 and the user terminal 12 have a one-to-one relationship. However, the relationship may be a one-to-n relationship.

The information provision system 10 sets a multiplex level for sounds (contents) based on, for example, the proficiency level towards the system and the familiarity with the sounds of each user, and provides the sounds based on the set multiplex level. Here, the information provision system 10 may be an audio augmented reality (AR) system that creates a plurality of audio AR environments. Audio AR refers to a technique in which, for example, sound environments surrounding a certain location are aggregated as virtual speakers (virtual sound sources) of a limited quantity, and the aggregated information is transmitted to another location and reproduced. In the audio AR system that creates a plurality of audio AR environments, the number of multiplexing in the audio AR is changed depending on a combination of the familiarity of the user (such as usage time and number of uses), the sound quality of the plurality of audio AR environments, and the like. As a result, the information provision system 10 is capable of generating a suitably multiplexed sound that is recognizable by the user and is capable of efficiently providing a plurality of sounds.

The information provision device 11 determines a maximum multiplex level and sound numbers of the sounds to be provided, based on the proficiency level towards the information provision system 10 and the familiarity with the sounds for each user who is using the user terminal 12. The sound number refers to a value set for each sound in accordance with, for example, the familiarity of the user. The sound number is used during calculation of the multiplex number. For example, the sound number is set to "1" for a sound that the user has not heard before. Conversely, a sound number that is smaller than "1", such as "0.8" or "0.5", is set for a sound that the user has heard numerous times before and is able to understand, to a certain extent, what is being said on the whole by listening to a part of the sound. The effect of multiplexing a sound such as this with another sound is minimal. The sound number is an example of a proportion (recognition rate) of an amount of information that allows the user to recognize the information. Similar values may also be set for contents other than sound, such as video and text information.

The information provision device 11 controls the playback of sounds based on the above-described sound number, such that the sum of the sound numbers does not exceed a maximum multiplex level. For example, even when the maximum multiplex level is "1", if the sounds are two familiar sounds that both have the sound number "0.5", the information provision device 11 is capable of multiplexing these sounds. As a result, the information provision device 11 is capable of actualizing information provision that is suitable for each user. In addition, as a result of each user being provided sounds that are easily distinguished, the efficiency of sound provision may be improved.

The information provision device 11 is, for example, a server or a personal computer (PC), but is not limited thereto. For example, the information provision device 11 may be actualized by cloud computing that includes one or more information processing devices.

The user terminal 12 is a terminal that is used to acquire information from the information provision device 11. For example, the user terminal 12 transmits to the information provision device 11, over the communication network 13, user information for identifying the user who is using the user terminal 12 and current position information (such as longitude and latitude, or coordinates) of the user terminal 12. In addition, the user terminal 12 receives multiplexed sound based on the user information obtained from the information provision device 11 and outputs the received sound.

For example, the user terminal 12 is capable of receiving multiplexed sound based on the above-described audio AR from the information provision device 11 and playing back the received sound. The sound outputted from the user terminal 12 is not limited to sound based on audio AR.

The user terminal 12 is, for example, a tablet terminal or a communication terminal, such as a smart phone or a mobile phone, but is not limited thereto. The user terminal 12 may also be a gaming device, a music player, or the like.

The communication network 13 is a network, such as the Internet or a local area network (LAN). The communication network 13 may be wired, wireless, or a combination thereof.

Next, examples of the functional configurations of the information provision device 11 and the user terminal 12 in FIG. 1 will be described.

<Example of a Functional Configuration of the Information Provision Device 11>

The information provision system 10 illustrated in FIG. 1 includes a communication unit 21, a terminal information acquiring unit 22, a selecting unit 23, a maximum multiplex number determining unit 24, a sound number determining unit 25, a sound providing unit 26, and a proficiency level information managing unit 27. In addition, the information provision device 11 includes a content index 31, usage management information 32, maximum multiplex number determination criteria 33, sound number determination criteria 34, proficiency level information 35, and content main body 36. These pieces of information are stored in a storage unit or the like of the information provision device 11.

The communication unit 21 performs transmission and reception of data to and from the user terminal 12 over the communication network 13. The communication unit 21 receives a sound request (information request) from the user terminal 12. The sound request includes the user information for identifying the user, the current position information of the user terminal 12, and the like. The communication unit 21 outputs the received sound request to the terminal information acquiring unit 22. In addition, the communication unit 21 outputs one or a plurality of sounds acquired by the sound providing unit 26 to the user terminal 12 using the communication network 13.

The terminal information acquiring unit 22 acquires the user information of the user who is using the user terminal 12 and the position information of the user terminal 12 from the sound request acquired by the communication unit 21.

The selecting unit 23 acquires one or a plurality of contents from the content index 31 based on the position information of the user terminal 12 acquired from the terminal information acquiring unit 22. For example, the selecting unit 23 compares the position information of the user terminal 12 with the position information of a position at which a sound (content) is outputted that is included in the content index 31. When the distance between the two positions is within a predetermined value, the selecting unit 23 acquires information related to the sound. The information related to the sound is, for example, a person ID that identifies the person who is emitting the sound or a sound ID that identifies the sound details, but is not limited thereto.

The selecting unit 23 may use other methods of selection, in addition to merely selecting the sound based on the distance between the two positions, as described above. For example, the selecting unit 23 sets a predetermined area (such as within a radius of 10 m from the position in the position information) with reference to the position information of the user terminal 12. Next, the selecting unit 23 may reference the content index 31 and acquire the information related to content (sound) of which the position in the position information is included within the above-described predetermined area.

For example, when the selecting unit 23 selects a plurality of contents, the selecting unit 23 acquires sounds that have not yet been acquired, among the sounds included in the content index 31, in the order of the sound ID closest in distance from the position in the position information of the user terminal 12. In addition, the selecting unit 23 selects the sounds to be multiplexed based on the sound number of each sound acquired from the sound number determining unit 25, such that the maximum multiplex number acquired by the maximum multiplex number determining unit 24 is not exceeded.

In addition, for example, when a sound is selected, the selecting unit 23 issues an independent usage ID, adds the usage ID to the usage management information 32, and makes the sound providing unit 26 manage the usage ID. The selecting unit 23 may also adjust the above-described sound number in accordance with the usage state of each sound for each user terminal 12 based on the usage management information 32.

The maximum multiplex number determining unit 24 determines the maximum multiplex number of sounds corresponding to each user, based on the maximum multiplex number determination criteria 33 set in advance and the proficiency level information 35. In addition, the sound number determining unit 25 determines the sound number of each sound based on the sound number determination criteria 34 set in advance and the proficiency level information 35. The maximum multiplex number determining unit 24 and the sound number determining unit 25 may be configured, for example, as a single determining unit.

The sound providing unit 26 references the content main body 36 in which numerous contents are collected in advance, based on the sound ID included in the usage management information 32, and extracts the corresponding sound (content). In addition, the sound providing unit 26 multiplexes the extracted sounds and transmits the multiplexed sound from the communication unit 21 to the user terminal 12 at a predetermined timing.

In addition, for example, the sound providing unit 26 may aggregate sounds and perform sound localization for audio AR playback based on movement direction, attitude information, and the like of the user that are included in the sound request acquired from the user terminal 12. For example, the sound providing unit 26 is capable of performing sound localization by setting the position from which each sound is able to be heard by the user, based on the attitude information of the user and virtual speaker placement information set in advance. Here, sound localization is performed by a process for convoluting a head related transfer function (HRTF) corresponding to an arbitrary direction in sound data (sound source signals), using HRTF or the like. As a result, an effect may be achieved in which the sound seems to be heard from the arbitrary direction.

The sound providing unit 26 may multiplex a plurality of sounds and simultaneously output the sounds. However, the sound providing unit 26 may also multiplex a plurality of sounds such that a usage start time of each of the plurality of sounds is shifted from each other to allow the start of each sound to be easily distinguished. The sound providing unit 26 stores timing information in the usage management information 32, the timing information indicating the timing at which the sound is transmitted to the user terminal 12 and used (played back). In addition, the sound providing unit 26 outputs, to the proficiency level information managing unit 27, information on a sound that has been transmitted to the user terminal 12 at a predetermined timing and of which using (playback) has been completed, thereby making the proficiency level information managing unit 27 update the proficiency level information 35. Furthermore, the sound providing unit 26 deletes the information on sound that has been outputted to the proficiency level information managing unit 27 from the usage management information 32.

The proficiency level information managing unit 27 performs management of generation, update, and the like of a proficiency level (such as the familiarity with a person or the familiarity with a sound) corresponding with, for example, a cumulative usage time of the user for each sound, based on sound information of a sound that has already been played back, acquired by the sound providing unit 26.

<Example of a Functional Configuration of the User Terminal 12>

The user terminal 12 illustrated in FIG. 1 has a communication unit 41, earphones 42 that serve as an example of a sound output unit, and a position sensor 43 that serves as an example of a measuring unit.

The communication unit 41 performs transmission and reception of data to and from the information provision device 11 over the communication network 13. For example, the communication unit 41 generates a sound request that includes position information acquired from the position sensor 43 and user information, and transmits the sound request to the information provision device 11. The sound request may also include movement direction, attitude information, and the like of the user. In addition, the communication unit 41 receives one or a plurality of multiplexed sounds acquired from the information provision device 11 and outputs the received sound from the earphones 42.

The earphones 42 output playback of sound from the information provision device 11 that has been acquired from the communication unit 41. For example, as a result of the earphones 42 being attached to both ears of the user, audio AR sounds from virtual speakers and the like are able to be outputted to the user from both left and right ears. The sound output unit is not limited to the earphones 42. For example, a headphone or surround speakers may be used as the sound output unit.

The position sensor 43 acquires the position of the user terminal 12 at a predetermined timing, such as in real-time, at a predetermined time interval, or when the user generates a sound request. The position sensor 43 may acquire position information using a global positioning system (GPS) function or the like. Position acquisition by the position sensor 43 is not limited to the GPS function, described above. The position sensor 43 may acquire position information with reference to the position of a base station, a relay device, or the like with which the user terminal 12 is capable of communicating.

In addition, the position sensor 43 may be a sensor that detects the movement direction, attitude information, and the like of the user. The attitude information is, for example, information indicating the attitude of the head portion of the user and indicates the direction in which the user is facing. For example, the attitude information may be expressed by 0 to 360 degrees with a certain direction (such as north) set to 0 degrees, but is not limited thereto. In addition, the attitude information may include the up/down direction (angle) of the head portion. The position sensor 43 in this instance may acquire the head portion attitude (orientation)

by an acceleration sensor, an orientation sensor, or the like being attached to the head portion of the user. In addition, the position sensor 43 may acquire the head portion attitude of the user from a subject (such as a structure) appearing in an image captured by an imaging unit, such as a camera, but is not limited thereto. The sound output unit and the measuring unit described above may be integrally formed as a headphone or the like.

According to the present embodiment, if the user is a proficient user who has received sound provision from the information provision system 10 several times, for example, even when three sounds are provided in an overlapping manner, the user is capable of understanding the positions and details of the objects and persons. However, a user who is experiencing the sound provision for the first time becomes unable to understand the positions and details of the objects and persons simply by one sound being overlapped during playback by another sound. In other words, familiarity with the information provision system 10 and learning of sounds improve the sensation of localization of sounds.

Therefore, according to the present embodiment, the multiplex level for presenting the sounds is changed depending on individual differences, environmental differences, and the like. Examples of individual differences and environmental differences include factors such as: whether or not the user knows the tone or the details of the sound, whether or not the tone is similar among a plurality of objects, whether or not the position is at a distance, and whether or not the object or person is visible, as well as combinations of sound quality and the like. However, individual differences and environmental differences are not limited thereto. Therefore, as a result of the multiplex level for providing sound being changed based on the differences in persons and situations, information provision that is most efficient for the user at that time may be actualized.

<Example of a Hardware Configuration of the Information Provision Device 11>

Figure 2:
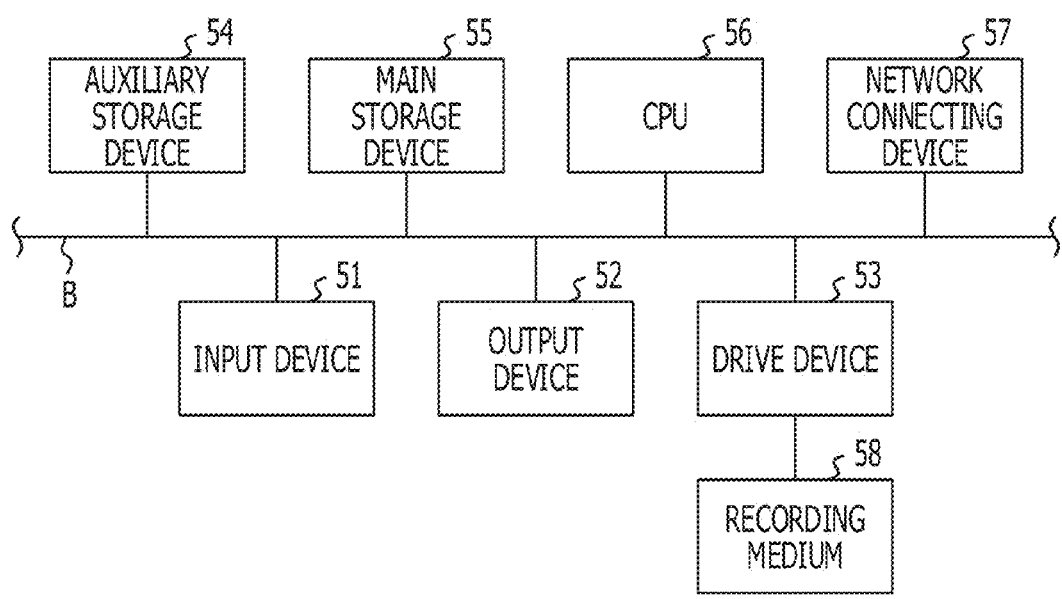
FIG. 2 is a diagram of an example of a hardware configuration of an information provision device.

Next, an example of a hardware configuration of the information provision device 11 will be described with reference to FIG. 2. FIG. 2 is a diagram of an example of a hardware configuration of the information provision device. In the example in FIG. 2, the information provision device 11 includes an input device 51, an output device 52, a drive device 53, an auxiliary storage device 54, a main storage device 55, a central processing unit (CPU) 56, and a network connecting device 57. These components are connected to each other by a system bus B.

The input device 51 receives input, such as program execution instructions, various pieces of operating information, and information for starting software and the like, from a manager of the information provision device 11 or the like. The input device 51 has a keyboard, a pointing device such as a mouse, and a sound input device such as a microphone that are operated by the manager of the information provision device 11 or the like.

The output device 52 includes a display that displays various types of windows, data, and the like that are used for operating the information provision device 11 according to the present embodiment. The output device 52 is capable of displaying progress, results, and the like of program execution by a control program included in the CPU 56.

Here, executable programs that are installed in a computer main body of the information provision device 11 or the like are provided by, for example, a recording medium 58. The recording medium 58 in which a program is recorded is capable of being set in the drive device 53. The executable program included in the recording medium 58 is installed in the auxiliary storage device 54 via the drive device 53 from the recording medium 58, based on a control signal from the CPU 56.

The auxiliary storage device 54 stores therein the executable programs according to the present embodiment, control programs provided in the computer, and the like based on control signals from the CPU 56, and performs input and output as occasion calls. The auxiliary storage device 54 is capable of reading desired information from the pieces of stored information and writing desired information, based on control signals from the CPU 56 and the like. The auxiliary storage device 54 is, for example, a storage unit such as a hard disk drive (HDD) or a solid state drive (SSD). The auxiliary storage device 54 stores therein, for example, the above-described content index 31, the usage management information 32, the maximum multiplex number determination criteria 33, the sound number determination criteria 34, the proficiency level information 35, and the content main body 36.

The main storage device 55 temporarily stores therein an operating system (OS) program and at least some application programs executed by the CPU 56. In addition, the main storage device 55 stores therein various pieces of data desired for processes to be performed by the CPU 56. The main storage device 55 is, for example, a read-only memory (ROM), or a random access memory (RAM).

The CPU 56 controls processes of the overall computer such as the information provision device 11 and actualizes the processes, based on control programs for the OS and the like, and executable programs stored in the main storage device 55. The processes include various calculations, input and output of data to and from hardware configuration components, and the like. The various pieces of information and the like to be used during execution of the programs may be acquired from the auxiliary storage device 54, for example, and execution results and the like may also be stored.

For example, the CPU 56 executes a program (such as an information provision program) that is installed in the auxiliary storage device 54 based on a program execution instruction and the like acquired from the input device 51, thereby performing a process corresponding to the program in the main storage device 55. For example, the CPU 56 executes the information provision program, thereby performing processes such as the above-described transmission and reception of various pieces of data by the communication unit 21, acquisition of information related to the user terminal 12 by the terminal information acquiring unit 22, content selection by the selecting unit 23, and determination of the maximum multiplex number by the maximum multiplex number determining unit 24. In addition, the CPU 56 performs processes such as determination of the sound number by the sound number determining unit 25, sound provision by the sound providing unit 26, and management of proficiency level information by the proficiency level information managing unit 27. The details of the processes performed by the CPU 56 are not limited thereto. The details of the processes performed by the CPU 56 are stored in the auxiliary storage device 54 as occasion calls.

The network connecting device 57 performs communication with the user terminal 12 by connecting to the above-described communication network 13 or the like based on control signals from the CPU 56. In addition, the network connecting device 57 is capable of acquiring executable programs, software, setting information, and the like from an external device or the like that is connected to the communication network 13. Furthermore, the network connecting device 57 is capable of providing the execution results acquired through execution of the program or the executable program itself according to the present embodiment to the external device or the like.

The recording medium 58 is a computer-readable recording medium that stores therein the executable programs or the like, as described above. The recording medium 58 is, for example, a semiconductor memory such as a flash memory, or a portable recording medium such as a CD-ROM or a DVD, but is not limited thereto.

As a result of the hardware configuration such as that described above, the information provision process according to the present embodiment is able to be performed. According to the present embodiment, the information provision process according to the present embodiment may be actualized through cooperation between hardware resources and software, as a result of the executable program (information provision program) that enables the computer to perform each function being installed on, for example, a general-purpose PC.

<Example of a Hardware Configuration of the User Terminal 12>

Figure 3:
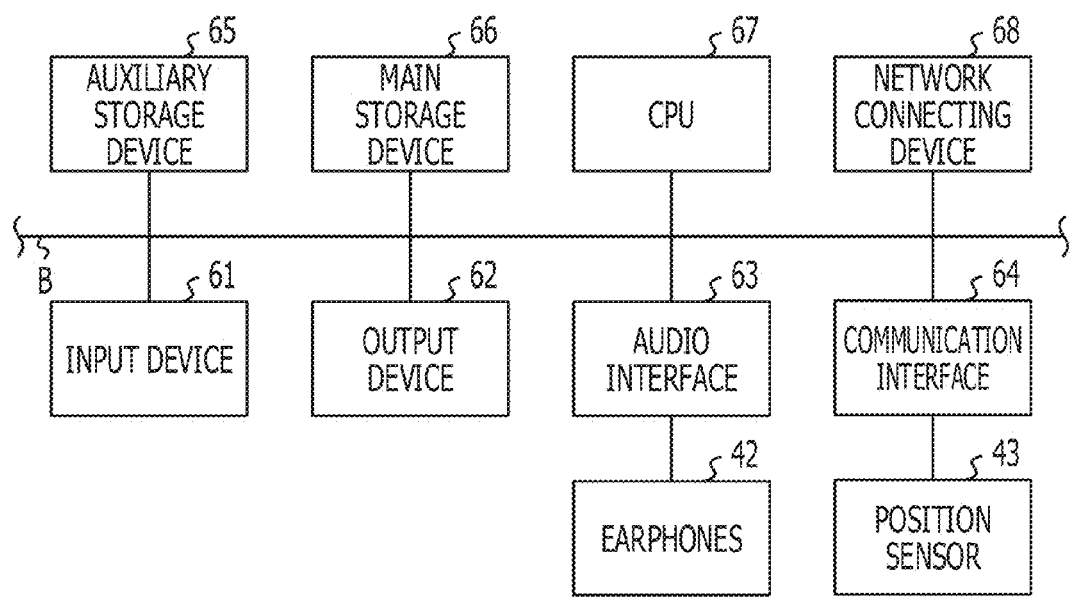
FIG. 3 is a diagram of an example of a hardware configuration of a user terminal.

Next, an example of a hardware configuration of the user terminal 12 will be described with reference to FIG. 3. FIG. 3 is a diagram of an example of a hardware configuration of the user terminal. In the example in FIG. 3, the user terminal 12 includes an input device 61, an output device 62, an audio interface 63, a communication interface 64, an auxiliary storage device 65, a main storage device 66, a CPU 67, and a network connecting device 68. These components are connected to each other by the system bus B.

The input device 61 receives input, such as program execution instructions, various pieces of operating information, and information for starting software and the like, from the user who is using the user terminal 12. The input device 61 is, for example, a touch panel or a predetermined operating key. Signals based on operations performed on the input device 61 are transmitted to the CPU 67.

The output device 62 includes a display that displays various types of windows, data, and the like that are desired for operating the user terminal 12 according to the present embodiment. The output device 62 is capable of displaying progress and results of program execution, setting information, and the like by a control program included in the CPU 67.

The audio interface 63 converts, for example, one or a plurality of digital sounds acquired from the information provision device 11 to analog sound under the control of the CPU 67 or the like. The audio interface 63 also amplifies the converted analog sound and outputs the analog sound to the above-described earphones 42 or the like.

The communication interface 64 acquires the position information of the user terminal 12 (such as longitude and latitude, or coordinates) from the above-described position sensor 43, the attitude information of the head portion of the user, and the like.

For example, the auxiliary storage device 65 writes and reads out magnetic data on and from a magnetic disk provided therein. The auxiliary storage device 65 stores therein an OS program, application programs, and various pieces of data. The auxiliary storage device 65 is, for example, a storage unit such as a flash memory, a HDD, or a SSD. The auxiliary storage device 65 stores therein user information, position information, and the like.

The main storage device 66 temporarily stores therein an OS program and at least some application programs executed by the CPU 67. In addition, the main storage device 66 stores therein various pieces of data to be used for processes performed by the CPU 67. The main storage device 66 is, for example, a ROM or a RAM.

The CPU 67 controls processes of the overall computer such as the user terminal 12 and actualizes the processes, based on control programs for the OS and the like, and executable programs stored in the main storage device 66. The processes include various calculations, input and output of data to and from hardware configuration components, and the like. The various pieces of information and the like to be used during execution of the programs may be acquired from the auxiliary storage device 65, for example, and execution results and the like may also be stored.

For example, the CPU 67 executes a program (such as the information provision program) that is installed in the auxiliary storage device 65 based on a program execution instruction and the like acquired from the input device 61, thereby performing a process corresponding to the program in the main storage device 66.

For example, the CPU 67 executes the information provision program, thereby performing processes such as the above-described transmission and reception of various pieces of data by the communication unit 41, sound output by the earphones 42, and acquisition of position information by the position sensor 43. The details of the processes performed by the CPU 67 are not limited thereto. The details of the processes performed by the CPU 67 are stored in the auxiliary storage device 65 as occasion calls.

The network connecting device 68 acquires executable programs, software, setting information, and the like from, for example, an external device (such as the information provision device 11) that is connected to the communication network 13 by connecting to the communication network 13 and the like, based on control signals from the CPU 67. The network connecting device 68 is capable of providing the execution results acquired through execution of the program or the executable program itself according to the present embodiment to the external device or the like. In addition, the network connecting device 68 may include a communication unit that enables communication using Wi-Fi®, Bluetooth®, or the like. Furthermore, the network connecting device 68 may include a calling unit that enables calls to and from a telephone terminal.

As a result of the hardware configuration such as that described above, the information provision process according to the present embodiment is able to be performed. According to the present embodiment, the information provision process according to the present embodiment may be actualized through cooperation between hardware resources and software, as a result of the executable program (information provision program) that enables the computer to perform each function being installed on, for example, a communication terminal.

<Example of Processes Performed by the Information Provision System 10>

Figure 4:
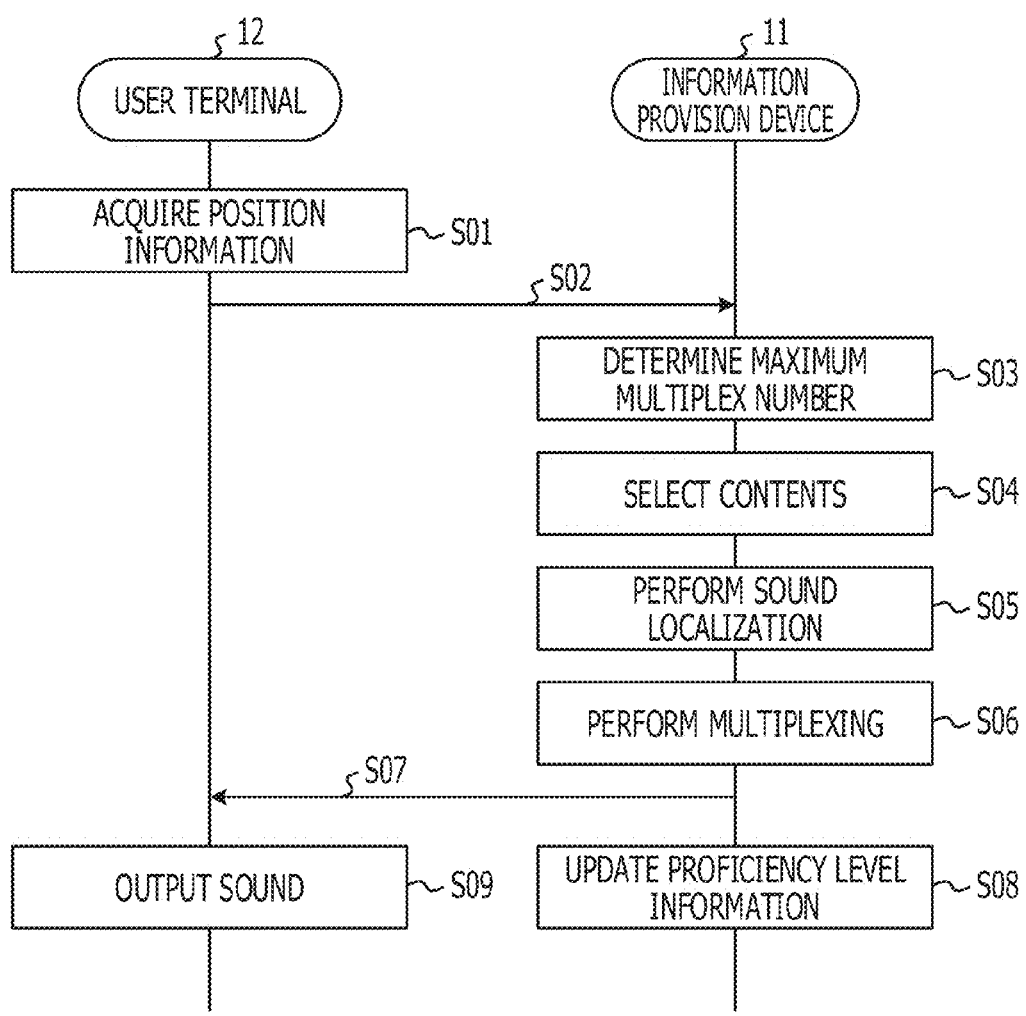
FIG. 4 is a sequence chart of an example of processes performed by the information provision system.

Next, an example of the processes performed by the above-described information provision system 10 will be described with reference to a sequence chart. FIG. 4 is a sequence chart of an example of the processes performed by the information provision system. In the example in FIG. 4, an overall sequence that includes an information provision process by the above-described information provision device 11 and an information acquisition process by the user terminal 12 is illustrated.

In the example in FIG. 4, the position sensor 43 of the user terminal 12 acquires the position information of the user terminal 12 (S01). The position sensor 43 then transmits a sound request that includes the acquired position information and the user information of the user terminal 12 to the information provision device 11 over the communication network 13 (S02). The processes at S01 and S02 may be performed by the user terminal 12 at a predetermined time interval. Alternatively, for example, the processes at S01 and S02 described above may be performed in response to a transmission of an acquisition request for position information from the information provision device 11 to the user terminal 12.

When the communication unit 21 of the information provision device 11 receives the sound request acquired from the user terminal 12, the maximum multiplex number determining unit 24 determines the maximum multiplex number from the user information and the position information included in the received sound request (S03). In the process at S03, the maximum multiplex number is determined for the user who has transmitted the sound request, based on the maximum multiplex number determination criteria 33, the proficiency level information 35, and the like set in advance.

Next, the selecting unit 23 selects contents within a range that does not exceed the maximum multiplex number determined in the process at S03 (S04). In the process at S04, when a plurality of contents are selected, the sound number determining unit 25 may adjust the sound numbers depending on the familiarity of the user with the sound, based on the sound number determination criteria 34, the proficiency level information 35, and the like set in advance for each content.

Next, the sound providing unit 26 acquires the sound corresponding to at least one of the contents selected at S04, and performs sound localization in accordance with the position information of the user terminal 12 to enable the acquired sound to be played back as an audio AR on the user terminal 12 side (S05). Next, the sound providing unit 26 performs multiplexing of sounds based on the maximum multiplex number and the sound numbers (S06). Next, the communication unit 21 transmits the multiplexed sound to the user terminal 12 (S07).

The proficiency level information managing unit 27 of the information provision device 11 performs management such as update of the proficiency level information 35 of the transmitted sound (S08). The communication unit 41 of the user terminal 12 receives the sound from the information provision device 11 and outputs the received sound from the sound output unit, such as the earphones 42 (S09).

The above-described processes are repeatedly performed until the sound request from the user terminal 12 is completed or the information provision process according to the present embodiment is completed by an instruction from the user. Therefore, sound data may be provided to the user in real-time, in accordance with movement of the user. In addition, when information provision by sound is simply performed without performing information provision based on audio AR, the process at above-described S05 does not have to be performed.

<Example of Various Pieces of Data and the Like>

Next, examples of various pieces of data and the like used in the above-described information provision system 10 will be described with reference to FIGS. 5A to 5E. FIGS. 5A to 5E are diagrams of examples of various pieces of data used in the information provision system. FIG. 5A illustrates an example of the content index 31. FIG. 5B illustrates an example of the usage management information 32. FIG. 5C illustrates an example of the maximum multiplex number determination criteria 33. FIG. 5D illustrates an example of the proficiency level information 35. FIG. 5E illustrates an example of the content main body 36.

Fields in the content index 31 illustrated in FIG. 5A include, for example, "person ID", "sound ID", "position", and "time", but are not limited thereto. The content index 31 may include an ID that identifies video, text information, and the like based on the type of content to be provided. "Person ID" illustrated in FIG. 5A is information for identifying a person, an object, a service, and the like for which the sound is outputted. "Sound ID" is information for identifying the content of the one or more sounds set for each person ID. Therefore, for example a plurality of sound IDs may be set for a single person ID.

"Position" indicates the position information of the position at which the sound corresponding to the sound ID is played back. In other words, when the distance between the position in the position information acquired from the user terminal 12 and the position in the position information of the content index 31 becomes shorter, the sound corresponding to the content (sound ID) is outputted from the user terminal 12. "Position" may be set as predetermined coordinates (x,y), but is not limited thereto. "Time" is the usage time of the sound corresponding to the sound ID. For example, "3 s" illustrated in FIG. 5A indicates that the usage time is 3 seconds.

Fields in the usage management information 32 illustrated in FIG. 5B include, for example, "usage ID", "user ID", "sound ID", "usage start time", "content length", and "sound number", but are not limited thereto.

"Usage ID" illustrated in FIG. 5B is information for identifying the sound to be used for playback or the like. The usage ID is managed by a different ID, such as by a combination of the user ID and the sound ID. "User ID" is information for identifying the user who is using the sound. "Sound ID" is information for identifying the sound to be used and is set to a similar ID as "sound ID" illustrated in FIG. 5A, for example.

"Usage start time" is the date and time at which the sound corresponding to the sound ID is to be used (played back). "Content length" is the length of the content to be used. For example, "4 s" indicates that a content that is four seconds long is to be used. "Sound number" is the sound number that has been determined by the sound number determining unit 25 in relation to the sound corresponding to the usage ID. The usage management information 32 illustrated in FIG. 5B is managed by the sound providing unit 26 such that, when a content is selected by the selecting unit 23, an independent usage ID is issued and added to the usage management information 32.

Fields of the maximum multiplex number determination criteria 33 illustrated in FIG. 5C include, for example, "cumulative usage time" and "maximum multiplex number", but are not limited thereto. "Cumulative usage time" illustrated in FIG. 5C is the cumulative time over which the user has used the system and is a setting value used to decide the maximum multiplex number. "Maximum multiplex number" is set to a maximum number of sounds that may be multiplexed in accordance with the set cumulative usage time.

In the example in FIG. 5C, the maximum multiplex number is 1 when the cumulative usage time is less than one hour. The maximum multiplex number is 2 when the cumulative usage time is one hour or more and less than seven days. The maximum multiplex number is 3 when the cumulative usage time is seven days or more. However, the setting details are not limited thereto.

Fields of the proficiency level information 35 illustrated in FIG. 5D include, for example, "name", "cumulative usage time", "familiarity with person", "familiarity with content", and "familiarity with location", but are not limited thereto. "Name" illustrated in FIG. 5D is information indicating a name corresponding to the user ID. "Cumulative usage time" is the cumulative usage time of the overall system for each user. The cumulative usage time may be in, for example, second units or day units.

"Familiarity with person" is information regarding the familiarity with a person that is set based on, for example, the sound number determination criteria 34 of the sound number determining unit 25. For example, person cumulative information, described hereafter, is stored in "familiarity with person". In addition, "familiarity with content" is information regarding the familiarity with a content that is set based on, for example, the sound number determination criteria 34 of the sound number determining unit 25. For example, content cumulative information, described hereafter, is stored in "familiarity with content". In addition, for example, location cumulative information, described hereafter, is stored in "familiarity with location".

The pieces of information related to "cumulative usage time", "familiarity with person", "familiarity with content", and "familiarity with location" are updated by the proficiency level information managing unit 27 after sound provision by the sound providing unit 26.

Fields in the content main body 36 illustrated in FIG. 5E include, for example, "sound ID", "uniform resource locator (URL)", and "details", but are not limited thereto. For example, the content main body 36 may include contents such as video and text information. "Sound ID" illustrated in FIG. 5E is information for identifying the sound, and is similar to the sound ID included in the above-described content index 31 and usage management information 32. "URL" is the address information of the storage destination of sound data corresponding to the "sound ID". The address information is not limited to the URL and may be set to a storage destination within the information provision device 11, for example. "Details" is information on the substance (such as spoken words) of the sound data corresponding to the sound ID.

FIGS. 6A to 6C are diagrams of examples of pieces of cumulative information included in the proficiency level information. FIG. 6A illustrates an example of the person cumulative information. FIG. 6B illustrates an example of the content cumulative information. FIG. 6C illustrates an example of the location cumulative information. Each piece of cumulative information corresponds with the proficiency level information 35 illustrated in FIG. 5D and indicates the cumulative information for a user ID "p01".

In the person cumulative information illustrated in FIG. 6A, for example, the usage time (playback time) accumulated for each person ID is stored. For example, the usage time may be stored in second units. In the content cumulative information illustrated in FIG. 6B, the number of uses accumulated for each sound ID is stored.

In the location cumulative information illustrated in FIG. 6C, the number of visits accumulated for each location is stored. Position information (such as longitude and latitude, or coordinates) may be included, and the location and the position information may be stored in the location name. "Number of visits" is the number of times the user has visited the location (position information) set in "location name", and is the number of times in relation to the position in the position information at which the content is used. The information allows determination to be made regarding whether or not the user has visited the location depending on whether or not the position in the position information from the user terminal 12 is near the above-described location or included within the area of the location. The number of visits is updated with each visit.

In these pieces of information, corresponding data is updated by the proficiency level information managing unit 27 each time a sound is provided by the sound providing unit 26 to the user terminal 12.

FIGS. 7A to 7C are diagrams of examples of the sound number determination criteria. FIG. 7A is an example of the sound number determination criteria in relation to the usage time for the tone of each person ID. For example, even when the same person ID outputs a different sound, the usage time is added as that of the same person. The usage time may be in, for example, second units or day units.

In the example in FIG. 7A, the user becomes more familiar with the sound as the usage time increases. Therefore, the sound number decreases as a result. However, the sound number may be adjusted so as not to become too small after a predetermined amount of time or more (such as eight hours or more). The details of the conversion from usage time to sound number are not limited to the example in FIG. 7A.

FIG. 7B is an example of the sound number determination criteria in relation to the number of uses of each sound ID. The number of uses may be counted such that, for example, a sound is considered to be used when the sound is transmitted from the information provision device 11 to the user terminal 12. Alternatively, the number of used may be counted when, for example, use-completed information is received from the user terminal 12 after use.

In the example in FIG. 7B, the user becomes more familiar with the sound as the number of uses increases. Therefore, the sound number is set to a small value. However, the sound number is adjusted so as not to become too small after a predetermined number of times or more (such as 16 times or more). The details of the conversion from number of uses to sound number are not limited to the example in FIG. 7B.

FIG. 7C is an example of the sound number determination criteria in relation to the number of visits to each location. In the example in FIG. 7C, the user becomes more familiar with the sound as the number of visits increases. Therefore, the sound number is set to a small value. However, the sound number is adjusted so as not to become too small after a predetermined number of times or more (such as 100 times or more). The details of the conversion from number of visits to sound number are not limited to the example in FIG. 7C.

The sound number determining unit 25 determines the sound number of a content for each user using the sound number acquired based on at least one of the above-described usage time, number of uses, and number of visits. When the sound number of a content is determined using a plurality of sound numbers, the sound number determining unit 25 may set priority levels for the usage time, the number of uses, and the number of visits. The sound number determining unit 25 may then acquire the sound number by performing calculations such as multiplication and addition upon adding weight based on the set priority levels.

According to the present embodiment, regarding familiarity with a tone of a person, the voice is easier to catch as the time over which the voice of the person is heard by itself increases. For example, as a basic intended use, familiarity with a tone of a person is for an acquaintance or a system sound. In addition, as in an initial example, the sounds of a town in which the user is living may be included. In addition, regarding the number of uses of a sound, the meanings of frequently used verbal contacts may be inferred even when the verbal contacts are multiplexed. In addition, because sound is strongly correlated with the location at which the sound is heard, as the number of visits to the location increases, the meaning of the sound provided from the location is better inferred even when the sound is multiplexed. Therefore, as a result of the sound numbers being set based on these indicators, appropriate multiplexed sounds may be provided. According to the present embodiment, through use of such data examples, sounds may be provided to various users at a multiplex level that is based on the proficiency level towards the system and the familiarity with the sound.

<Example of Processes Performed by the Selecting Unit 23>

Figure 8:
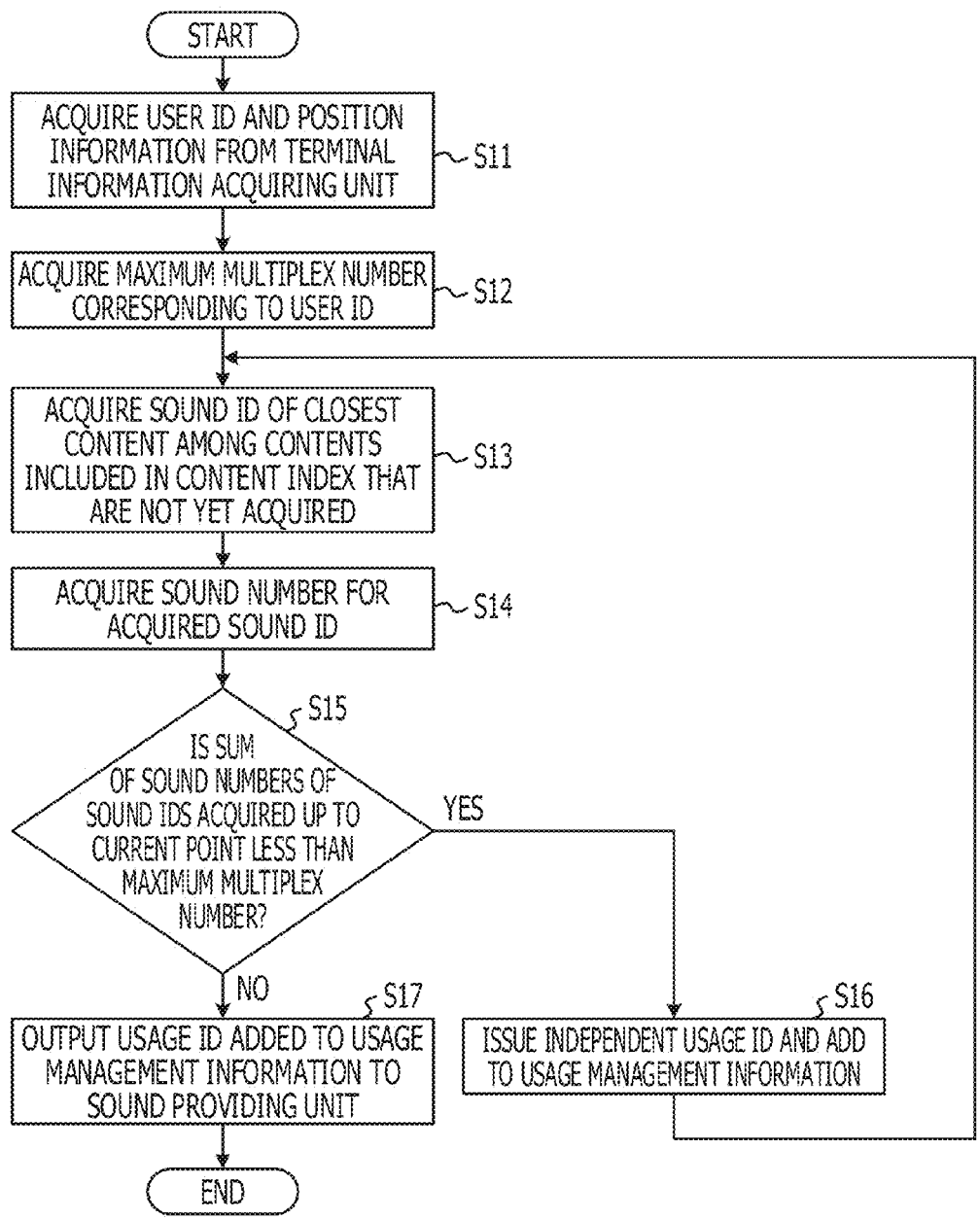
FIG. 8 is a flowchart of an example of processes performed by a selecting unit.

Next, an example of the processes performed by the above-described selecting unit 23 will be described with reference to a flowchart. FIG. 8 is a flowchart of an example of the processes performed by the selecting unit. In the example in FIG. 8, the selecting unit 23 acquires the user ID and the position information of the user terminal 12 from the terminal information acquiring unit 22 (S11). The selecting unit 23 then issues an inquiry to the maximum multiplex number determining unit 24 and acquires the maximum multiplex number corresponding to the user ID (S12).

Next, the selecting unit 23 acquires the sound ID having the position closest (nearest) to the position in the position information of the user, among contents included in the content index 31 that have not yet been acquired (S13). Next, the selecting unit 23 issues an inquiry to the sound number determining unit 25 and acquires the sound number for the sound ID acquired by the process at S13 (S14).

Next, the selecting unit 23 judges whether or not the sum of the sound numbers of the sound IDs acquired up to this point is less than the maximum multiplex number acquired by the process at S12 (S15). When judged that the sum of the sound numbers is less than the maximum multiplex number (YES at S15), for example, the selecting unit 23 issues an independent usage ID, adds the usage ID to the usage management information 32 (S16), and returns to the process at S13. In addition, when judged in the process at S15 that the sum of the sound numbers is not less than the maximum multiplex number (NO at S15), the selecting unit 23 outputs the usage ID that has been added to the usage management information 32 to the sound providing unit 26 (S17).

<Example of Processes Performed by the Maximum Multiplex Number Determining Unit 24>

Figure 9:
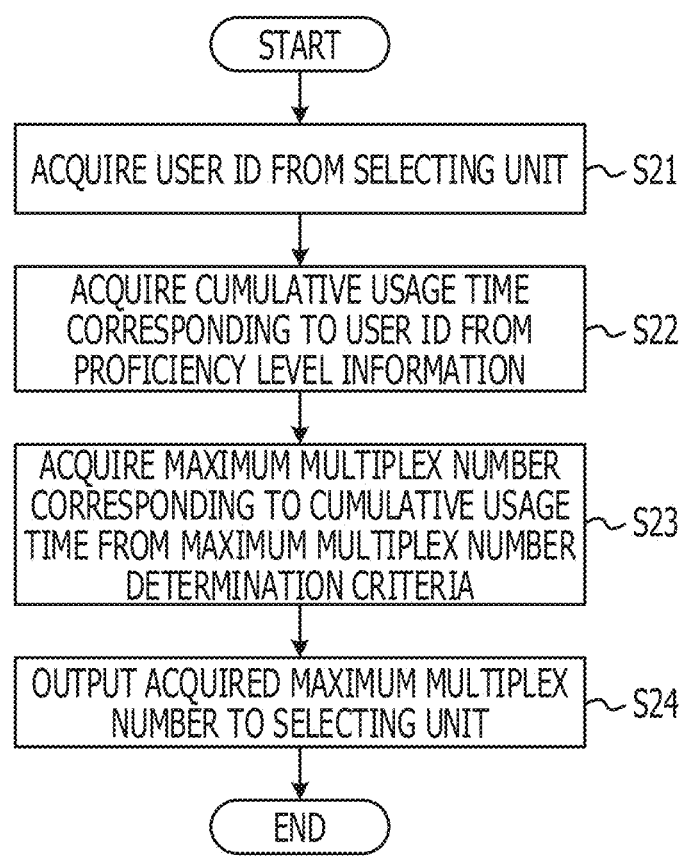
FIG. 9 is a flowchart of an example of processes performed by a maximum multiplex number determining unit.

Next, an example of the processes performed by the above-described maximum multiplex number determining unit 24 will be described with reference to a flowchart. FIG. 9 is a flowchart of an example of the processes performed by the maximum multiplex number determining unit. In the example in FIG. 9, the maximum multiplex number determining unit 24 acquires the user ID as the inquiry regarding the maximum multiplex number from the selecting unit 23 (S21). The maximum multiplex number determining unit 24 references the proficiency level information 35 using the acquired user ID and acquires the cumulative usage time corresponding to the user ID from the proficiency level information 35 (S22).

Next, the maximum multiplex number determining unit 24 references the maximum multiplex number determination criteria 33 using the acquired cumulative usage time and acquires the maximum multiplex number corresponding to the cumulative usage time from the maximum multiplex number determination criteria 33 (S23). Next, the maximum multiplex number determining unit 24 outputs the acquired maximum multiplex number to the selecting unit 23 (S24).

For example, when the user ID "p01" is acquired from the selecting unit 23, the maximum multiplex number determining unit 24 references the above-described proficiency level information 35 illustrated in FIG. 5D and acquires the cumulative usage time "103 hours 14 minutes". In addition, the maximum multiplex number determining unit 24 references the above-described maximum multiplex number determination criteria 33 illustrated in FIG. 5C and acquires the maximum multiplex number "2" corresponding to the cumulative usage time. The maximum multiplex number determining unit 24 then outputs the acquired maximum multiplex number "2" to the selecting unit 23.

<Example of Processes Performed by the Sound Number Determining Unit 25>

Figure 10:
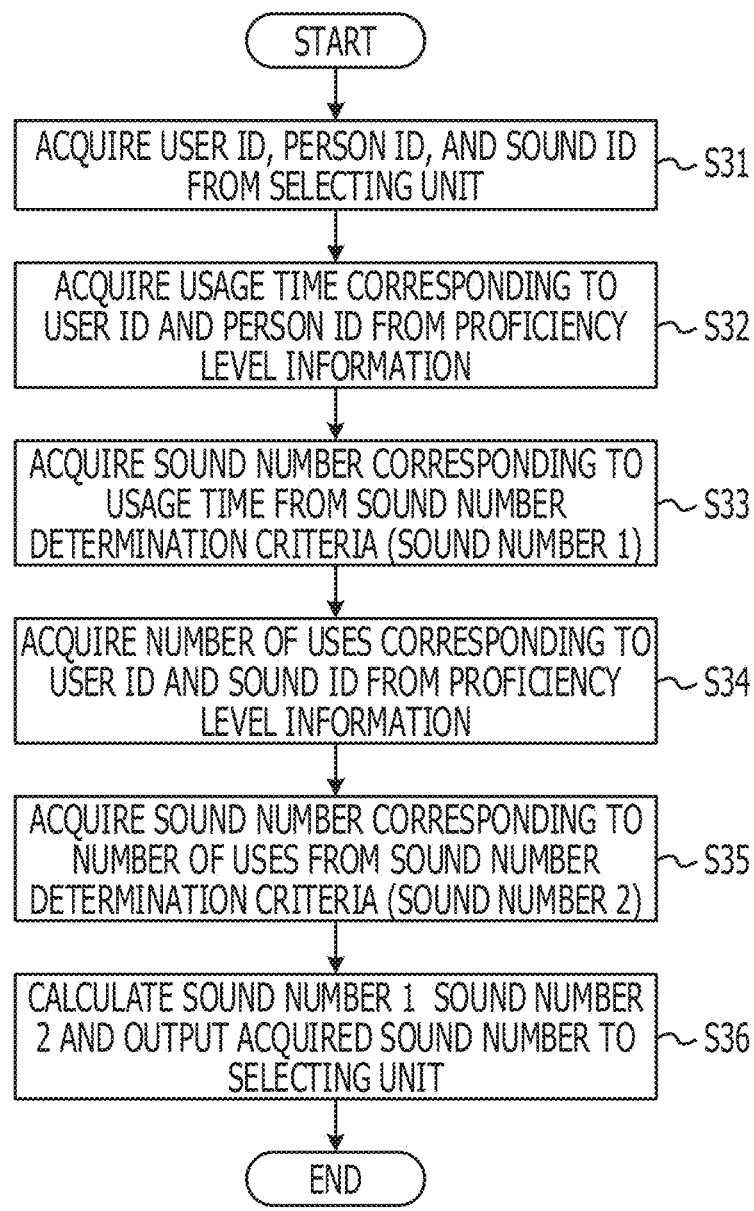
FIG. 10 is a flowchart of an example of processes performed by a sound number determining unit.

Next, an example of the processes performed by the above-described sound number determining unit 25 will be described with reference to a flowchart. FIG. 10 is a flowchart of an example of the processes performed by the sound number determining unit. In the example in FIG. 10, the sound number determining unit 25 acquires the user ID, the sound ID, and the person ID as the inquiry regarding the sound number from the selecting unit 23 (S31).

Next, the sound number determining unit 25 references the proficiency level information 35 using the acquired user ID and person ID, and acquires the usage time corresponding to the user ID and the person ID from the proficiency level information 35 (S32). Next, the sound number determining unit 25 acquires the sound number (sound number 1) corresponding to the usage time acquired in the process at S32 from the sound number determination criteria 34 (S33).

Next, the sound number determining unit 25 acquires the number of uses corresponding to the user ID and the sound ID from the proficiency level information 35 (S34). Next, the sound number determining unit 25 acquires the sound number (sound number 2) corresponding to the number of uses acquired in the process at S34 from the sound number determination criteria 34 (S35).

Next, the sound number determining unit 25 performs a calculation, such as multiplying the sound number 1 and the sound number 2 (sound number 1×sound number 2), and outputs the result to the selecting unit 23 (S36).

For example, when the sound number determining unit 25 acquires the user ID "p01" and the person ID "a" from the selecting unit 23, the sound number determining unit 25 acquires the usage time "14 minutes" from the above-described proficiency level information 35 illustrated in FIG. 5D and person cumulative information illustrated in FIG. 6A. In addition, the sound number determining unit 25 acquires the sound number "0.8" corresponding to the usage time "14 minutes" from the sound number determination criteria 34 illustrated in FIG. 7A (sound number 1). Furthermore, when the sound number determining unit 25 acquires the user ID "p01" and the sound ID "001" from the selecting unit 23, the sound number determining unit 25 acquires the number of uses "2 times" from the above-described proficiency level information 35 illustrated in FIG. 5D and content cumulative information illustrated in FIG. 6B. In addition, the sound number determining unit 25 acquires the sound number "0.8" corresponding to the number of uses "2 times" from the sound number determination criteria 34 illustrated in FIG. 7B (sound number 2). The sound number determining unit 25 then outputs to the selecting unit 23 the result (0.64) of the sound number 1 (0.8) multiplied by the sound number 2 (0.8). The outputted sound number is stored in the usage management information 32 by the selecting unit 23.

In the above-described example, the sound numbers corresponding to the familiarity with the person and the familiarity with the content are acquired, but are not limited thereto. A corresponding sound number may be acquired based on at least one familiarity level, among the familiarity with a person, the familiarity with a content, and the familiarity with a location.

<Example of Processes Performed by the Sound Providing Unit 26>

Figure 11:
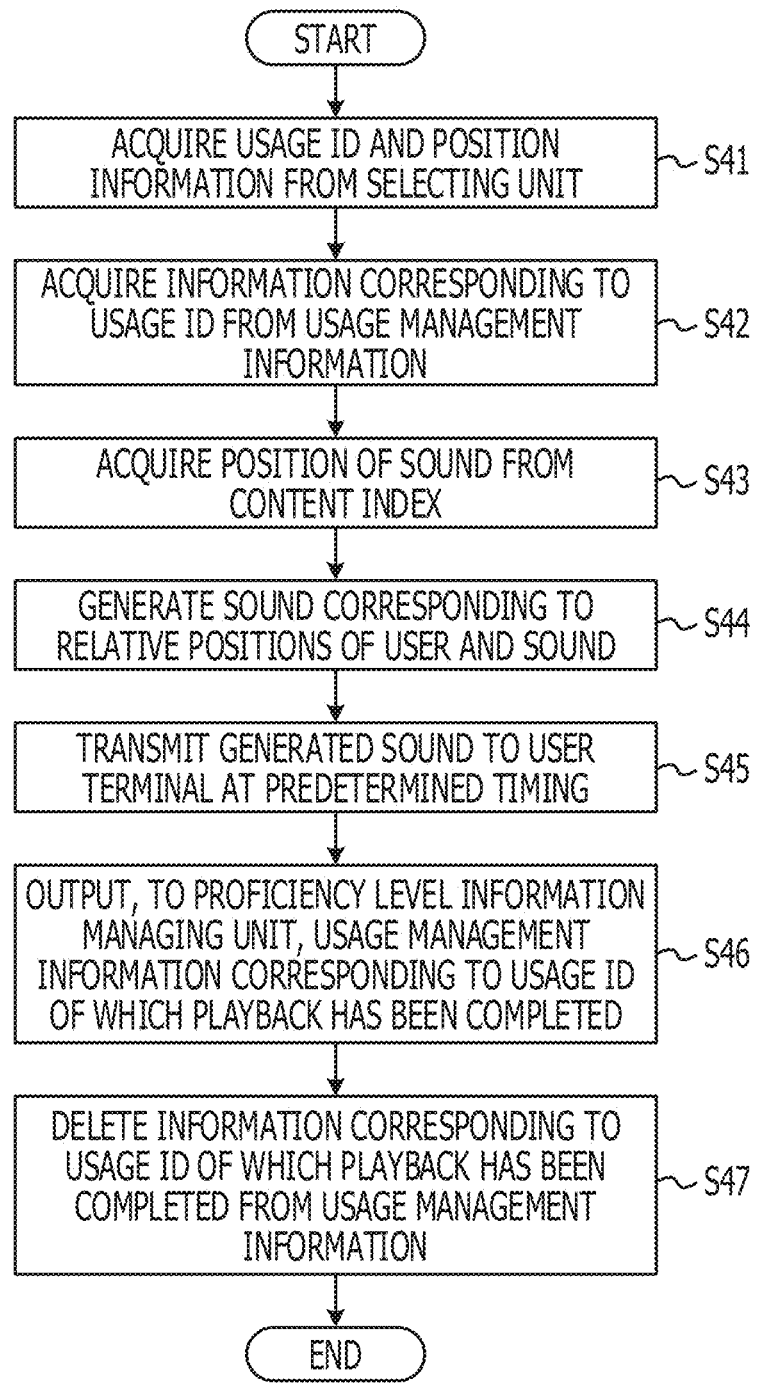
FIG. 11 is a flowchart of an example of processes performed by a sound providing unit.

Next, an example of the processes performed by the above-described sound providing unit 26 will be described with reference to a flowchart. FIG. 11 is a flowchart of an example of the processes performed by the sound providing unit. In the example in FIG. 11, the sound providing unit 26 acquires the usage ID and the position information of the user from the selecting unit 23 (S41).

Next, the sound providing unit 26 acquires information corresponding to the usage ID from the usage management information (S42) and acquires the position of the sound from the content index 31 (S43). The sound providing unit 26 then generates the sound corresponding to the relative positions of the user and the sound (S44).

Next, the sound providing unit 26 transmits the generated sound from the communication unit 21 to the user terminal 12 at a predetermined timing (S45). In the process at S45, for example, the sound providing unit 26 adds the generated sound to a sound that is being played back, thereby multiplexing the sounds, and transmits the multiplexed sound from the communication unit 21 to the user terminal 12. In addition, the sound providing unit 26 may perform sound localization before transmitting the sound to the user terminal 12.

Next, the sound providing unit 26 outputs, to the proficiency level information managing unit 27, the usage management information corresponding to the usage ID of which playback has been completed (S46). Next, the sound providing unit 26 deletes the entry of the usage ID of which use has been completed from the usage management information 32 (S47).

<Example of Processes Performed by the Proficiency Level Information Managing Unit 27>

Figure 12:
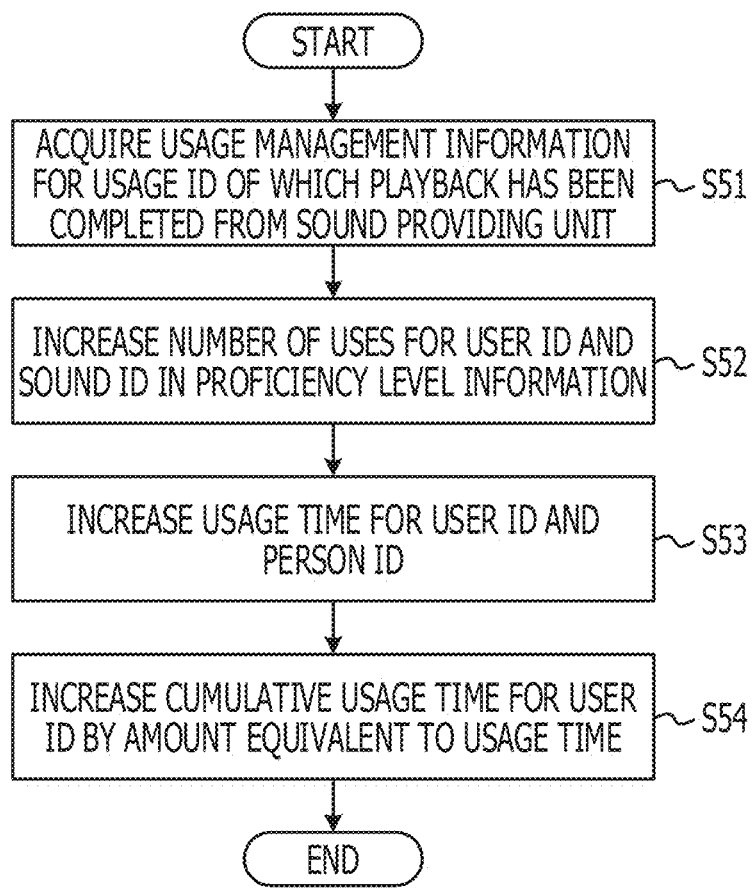
FIG. 12 is a flowchart of an example of processes performed by a proficiency level information managing unit.

Next, an example of the processes performed by the above-described proficiency level information managing unit 27 will be described with reference to a flowchart. FIG. 12 is a flowchart of an example of the processes performed by the proficiency level information managing unit. In the example in FIG. 12, the proficiency level information managing unit 27 acquires the usage management information for the usage ID of which playback has been completed from the sound providing unit 26 (S51). The proficiency level information managing unit 27 increases the number of uses by one for the user ID and the sound ID in the proficiency level information 35 (S52). Next, the proficiency level information managing unit 27 increases the usage time for the user ID and the person ID (S53), and increases the cumulative usage time for the user ID by an amount equivalent to the usage time (S54).

<Detailed Examples>

For example, sound provision by numerous people, objects, and services is performed in the streets or the like. The user preferably efficiently acquires a large number of sound information. However, in a conventional system, the user is forced to select only one sound and needlessly continue listening to redundant talk or, as a result of a plurality of sounds being simultaneously emitted, is unable to distinguish the sounds because the sounds are too overlapped.

Here, how easily sounds are distinguished when overlapped depends on individual differences and environmental differences. How easily sounds are distinguished differs depending on, for example, "whether or not the user knows the tone", "whether or not the user knows the content", "whether or not the tones are similar between a plurality of objects", "whether or not the position is at a distance", and "whether or not the object is visible".

Figures 13A, 13B:
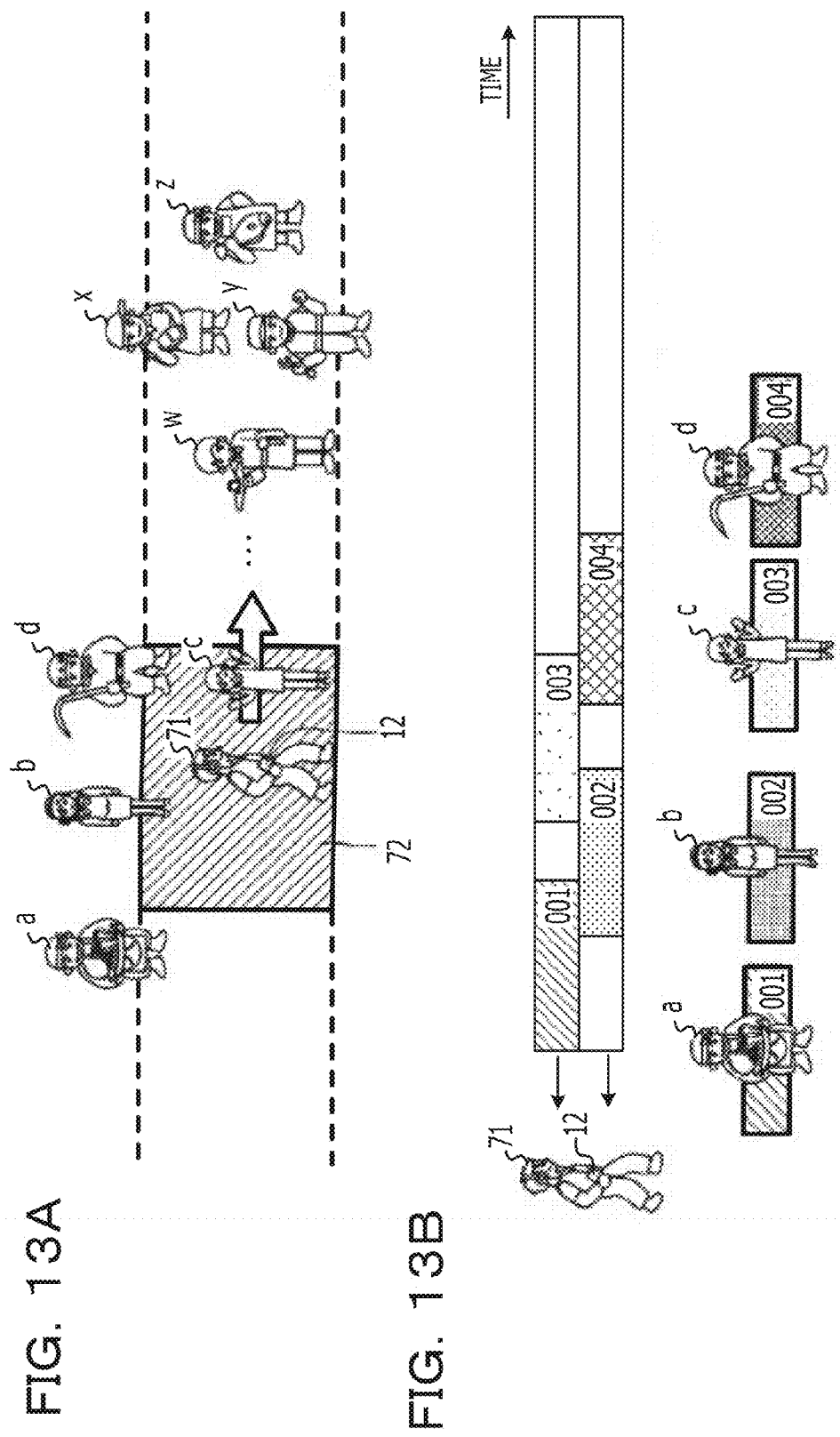
FIGS. 13A and 13B are diagrams for describing a detailed example of sound provision according to a present embodiment.

Therefore, according to the present embodiment, the multiplex level for sound provision is changed depending on the individual differences and environmental differences as described above. FIGS. 13A and 13B are diagrams for describing a detailed example of sound provision according to the present embodiment.

According to the present embodiment, as illustrated in FIG. 13A, a system is given in which sounds based on people, objects, services, and the like in the surrounding area are provided in accordance with the movement of a user 71 in a predetermined direction. For example, people from person IDs a to z are present around the user in an audio AR environment. The number of people is not limited thereto.

The user terminal 12 held by the user 71 acquires current movement information at a predetermined timing when periodic movement or movement of a predetermined distance or more is made regarding the movement of the user 71 in a predetermined direction. In addition, the user terminal 12 transmits the acquired position information together with the user information to the information provision device 11 over the communication network 13. The information provision device 11 provides sounds of a multiplex number that does not exceed the maximum multiplex number in order from the sound of the closest person, among the positions included in a predetermined area (such as an area 72 illustrated in FIG. 13A) from the current position of the user 71, based on the movement information acquired from the user terminal 12. At this time, according to the present embodiment, the maximum multiplex number is adjusted based on the maximum multiplex number of the sounds based on the proficiency level of the user 71 towards the system, sound numbers based on familiarity, and the like.

In the example in FIG. 13B, the maximum multiplex number is set to 2 in accordance with the proficiency level of the user 71 towards the system. The sounds of sound IDs 001 to 004 respectively corresponding to person IDs a to d are outputted from the user terminal 12 in accordance with the timing at which the user 71 is moving. According to the present embodiment, the sounds of sound IDs 001 to 004 are localized by the information provision device 11. In addition, the user 71 is capable of receiving sound provision in space by audio AR using the above-described method. For example, in the state in FIG. 13A, the sound of person ID "c" is heard from ahead of the user 71. The sound of person ID "b" is heard from the left of the user 71. The sound of person ID "d" is heard from ahead of the user 71 on the left.

Here, as an example of the user using the information provision system 10 according to the present embodiment, aspects of sound provision to a new user and a proficient user will be described with reference to FIGS. 14 and 15.

<In the Instance of a New User>

Figure 14:
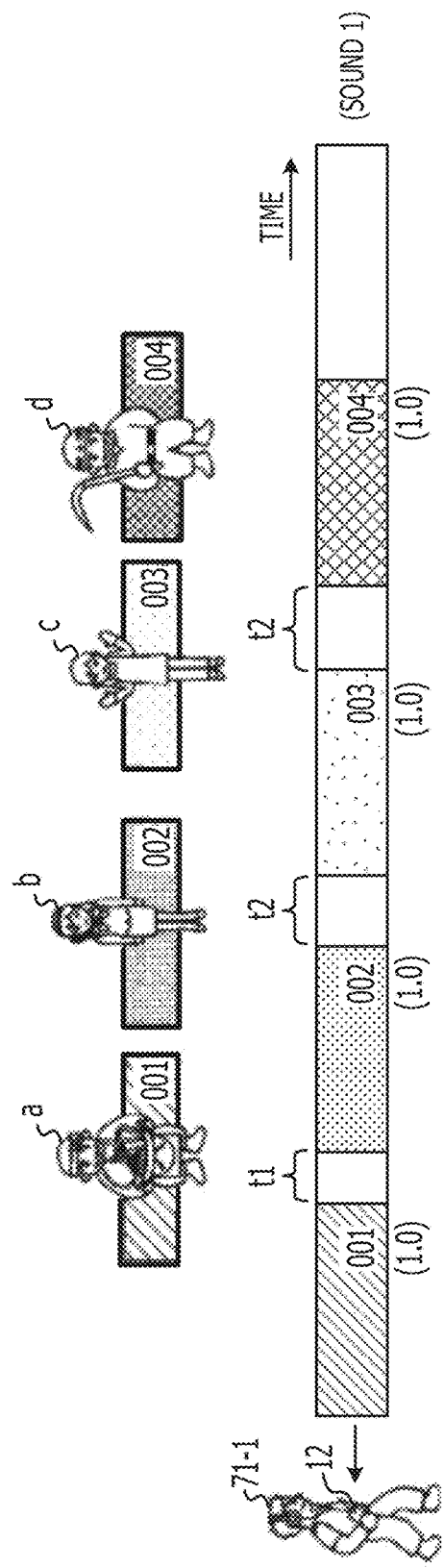
FIG. 14 is a diagram of an example of sound provision to a new user.

FIG. 14 is a diagram of an example of sound provision to a new user. A new user 71-1 has a low level of proficiency towards the system. Therefore, when numerous sounds are simultaneously provided, the new user 71-1 may not understand each sound. Therefore, in the instance of the new user

71-1, the information provision device 11 sets the maximum multiplex level to 1 (sound 1). In addition, in the instance of the new user 71-1, the information provision device 11 sets the sound number to "1.0" for the sound (sound ID "001") from a greengrocer owner (person ID "a") that the new user 71-1 is hearing for the first time. In a similar manner, the respective sound numbers are set to "1.0" for the sound (sound ID "002") from a bank employee (person ID "b"), the sound (sound ID "003") from a box lunch seller (person ID "c"), and the sound (sound ID "0004") from a construction worker (person ID "d").

In addition, the information provision device 11 acquires the sound corresponding to each sound ID from the content main body 36, and provides the acquired sound one by one to the user terminal 12 without multiplexing. Therefore, in the instance of the new user 71-1, the user is able to be provided with each sound at the timings illustrated in FIG. 14.

The information provision device 11 may adjust the interval (t1 to t3 in FIG. 14) at which each sound is provided. The adjustment may be performed, for example, by adjustment of the correlation of sound quality and details of sound between continuous sounds, but is not limited thereto. For example, when two continuous voices are male and female, the correlation may be considered low and the interval for output may be shortened. When the two voices are of the same sex, the correlation may be considered high and the interval for output may be extended. As a result, the new user 71-1 is able to receive appropriate information using the present embodiment.

<In the Instance of a Proficient User>

Figure 15:
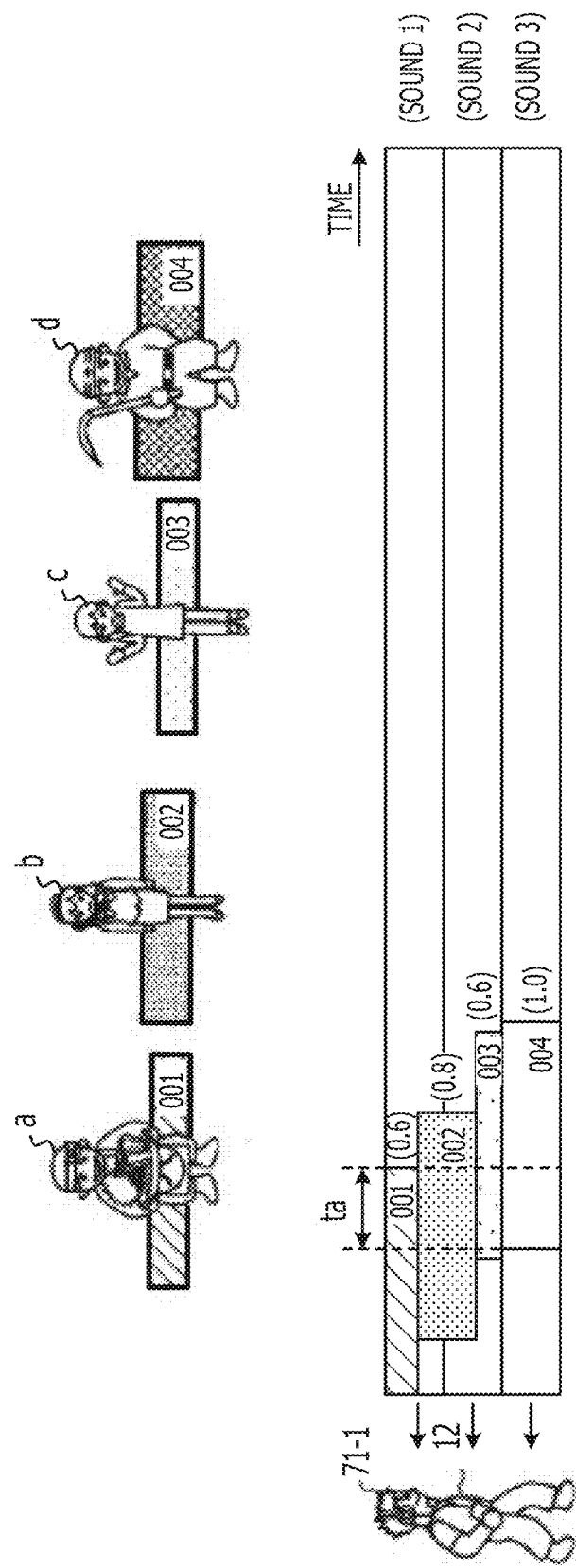
FIG. 15 is a diagram of an example of sound provision to a proficient user.

FIG. 15 is a diagram of an example of sound provision to a proficient user. A proficient user 71-2 has a high level of proficiency towards the system. Therefore, when familiar sounds are heard, the proficient user 71-2 is capable of understanding the sounds even when numerous sounds are provided simultaneously. Therefore, according to the present embodiment, numerous pieces of information are simultaneously provided.

For example, in the instance of the proficient user 71-2, the information provision device 11 sets the maximum multiplex number to 3 (sounds 1 to 3). In addition, in the instance of the proficient user 71-2, the information provision device 11 sets the sound number to "0.6" for the sound (sound ID "001") from the greengrocer owner (person ID "a") that the proficient user 71-2 often hears during day-to-day life. Moreover, the information provision device 11 sets the sound number to "0.8" for the sound (sound ID "002") from the bank employee (person ID "b") that the proficient user 71-2 has heard several times, and "0.6" for the sound (sound ID "003") from the box lunch seller (person ID "c") that the proficient user 71-2 often hears during day-to-day life. Furthermore, the information provision device 11 sets the sound number to "1.0" for the sound (sound ID "004") from the worker (person ID "d") at the construction that has recently begun.

In addition, the information provision device 11 acquires the sound corresponding to each sound ID from the content main body 36. The information provision device 11 then multiplexes the acquired sounds at a predetermined timing, and provides the multiplexed sound to the proficient user 71-2.

In the example in FIG. 15, the maximum multiplex number is 3. However, the sounds may be multiplexed based on a total value of the adjusted sound numbers so as not to exceed the maximum multiplex number. Therefore, as indicated at segment $t_a$ in FIG. 15, for example, four sounds may be simultaneously outputted. A reason for this is because the total value of sound IDs 001 to 004 is 0.6+0.8+0.6+1.0=3.0, which is equal to or less than the maximum multiplex number. As a result, the proficient user 71-2 is able to efficiently understand the surrounding area in a short amount of time.

As described above, according to the present embodiment, how easily sounds are distinguished when the sounds are overlapped may be set for each user.

As described above, the user is able to understand each sound because the sound numbers of the sounds to be multiplexed are set based on the proficiency levels. The above-described new user 71-1 and proficient user 71-2 are merely examples of the user. Specifically, the maximum multiplex number, the sound number, and the like are set based on the cumulative usage time and the like corresponding to the proficiency level information.

<Other Embodiments>

According to the above-described embodiment, the selecting unit 23 selects the contents based on the maximum multiplex number and the sound numbers. However, this is not limited thereto. For example, the selecting unit 23 may select the contents based on a priority level of each content that is set in advance in the content index 31. For example, when there are a plurality of contents which are at the same distance from the user terminal 12, the selecting unit 23 may select the contents based on the above-described priority levels.

An example in which priority levels are used is not limited thereto. For example, the contents to be provided may be selected based on priority levels, from among a plurality of contents included in a predetermined area with reference to the position of the user, regardless of whether or not the distances from the current position of the user are the same.

FIG. 16 is a diagram of an example of data in a content index having priority levels. Fields in the content index illustrated in FIG. 16 include, for example, "person ID", "sound ID", "position", "time", and "priority level". Here, compared to the above-described example of data in the content index 31 illustrated in FIG. 5A, in the example in FIG. 16, a priority level is set for each person ID or each sound ID. Three levels, "high", "medium", and "low" may be set as the priority levels illustrated in FIG. 16. However, the method for setting the priority level is not limited thereto. For example, ten levels may be set using numerical values.

For example, when the necessity is high for the user to recognize the sound with certainty as in "caution, under construction" of sound ID "004" or the like, the priority level is set to "high". In addition, when the necessity is low for the user to recognize the sound with certainty as in "welcome" of sound ID "001" or the like, the priority level is set to "low". Furthermore, as a result of the priority level being set for each person ID as illustrated in FIG. 16, for example, when the distance of person ID "a" and the distance of person ID "d" from the position of the user are the same, the content of person ID "d" is presented first based on the priority level.

The priority level illustrated in FIG. 16 may be set depending on the content of the person ID and the sound. For example, when the person ID is an ID corresponding to the police, the priority level may be set high. In the instance of a greengrocer or the like, the priority level may be set low.

Furthermore, for example, playback speed may be adjusted using the above-described priority level, such that sounds having a high priority level are played back at a low speed, and sounds having a low priority level are played back at a high speed. When the playback speed of the sound is adjusted, the sound providing unit 26 is capable of changing the playback speed based on the priority level as a result of the selecting unit 23 notifying the sound providing unit 26 of the priority level.

In addition, according to the present embodiment, in a manner similar to the adjustment of the playback speed, sound volume or sound pressure may be adjusted in accordance with the above-described priority level such that the sound volume of sounds having a high priority level is high and the sound volume of sounds having a low priority level is low. The setting of priority levels may be performed in advance by a manager or the like, but is not limited thereto.

Figure 17:
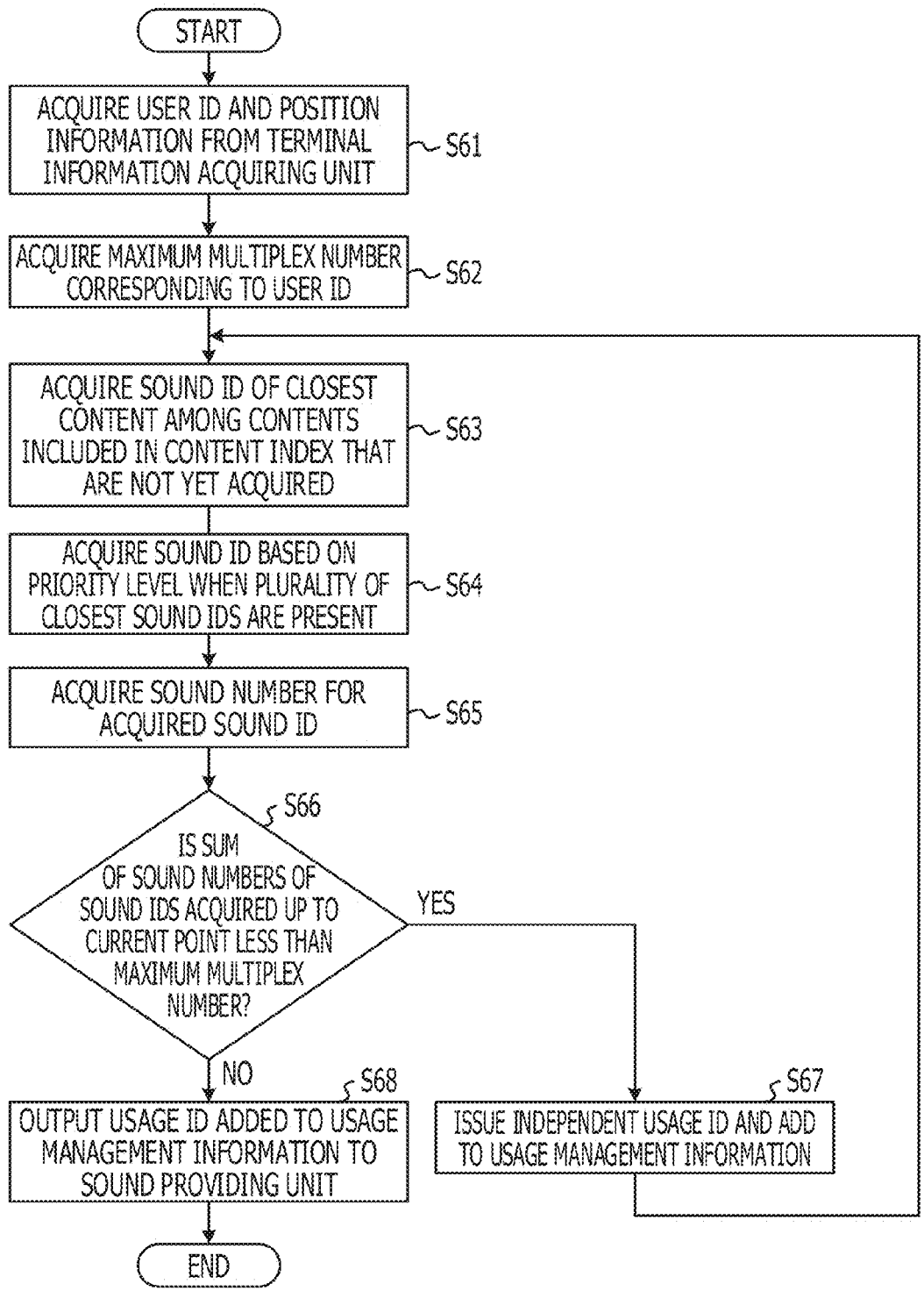
FIG. 17 is a flowchart of an example of processes performed by a selecting unit according to another embodiment.

FIG. 17 is a flowchart of an example of processes performed by a selecting unit according to another embodiment. In the example in FIG. 17, an example of the processes performed by the selecting unit that has the above-described priority levels is illustrated. In the example in FIG. 17, the selecting unit 23 acquires the user ID and the position information from the terminal information acquiring unit 22 (S61). The selecting unit 23 then issues an inquiry to the maximum multiplex number determining unit 24 regarding the maximum multiplex number corresponding to the user ID (S62).

Next, the selecting unit 23 acquires the sound ID having the position closest (nearest) to the position in the position information of the user from the content index 31, among contents that have not yet been acquired (S63). Next, when a plurality of sound IDs of which the positions are the closest are present, the selecting unit 23 acquires the sound ID based on the priority level (S64).

Here, the processes at S65 to S68 illustrated in FIG. 17 are similar to the above-described processes at S14 to S17. Therefore, detailed descriptions thereof are omitted herein. As described above, as a result of the priority levels being set, the sound which is has to be heard at the location is able to be preferentially provided to the user.

As described above, according to the present embodiment, suitable information provision may be actualized. For example, according to the present embodiment, the method of sound provision may be flexibly changed depending on the proficiency level towards the system and the familiarity with the sound of the user. For example, according to the present embodiment, how easily multiplexed sounds are distinguished may be set for each user.

For example, according to the present embodiment, in an audio AR system that creates a plurality of audio AR environments, the number of multiplexing in the audio AR is changed depending on a combination of the correlations of the familiarity of the user (such as usage time, number of uses, and number of visits), the sound quality of the plurality of audio AR environments, and the like. As a result, audio AR may be efficiently actualized in a manner that is recognizable by the user.

The present embodiment may be applied, for example, to a system in a museum, an art gallery, an exhibition hall, a shopping arcade, an amusement park, or the like that enables a user who is using an ear-mounted playback device, such as earphones or headphones, to hear sounds such as exhibition guidance or music related to an exhibition from the direction of an exhibited object or the like.

In addition, according to the present embodiment, an example in which sound is provided is given. However, this is not limited thereto. For example, information provision of other contents, such as video and text information, is also possible. A plurality of contents may also be combined and provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information provision device comprising:
a processor; and
a memory which stores a plurality of instructions, which when executed by the processor, cause the processor to execute,
selecting at least one of contents corresponding to position information of a user from the contents stored in a storage unit in advance;
determining a maximum number of the contents to be multiplexed on the basis of a cumulative usage time of the user for the contents;
multiplexing the at least two of the contents using a multiplexing number of the contents that corresponds with the cumulative usage time of the user to the selected the at least two of the contents being selected on the basis of the maximum number of the contents to be multiplexed; and
providing the multiplexed contents to the user.

2. The device according to claim 1, wherein the usage time of the user to the contents are corresponding to at least one of usage time to a person providing the contents, usage time to the contents, and usage time to a location from which the contents are provided.

3. The device according to claim 1, further comprising:
determining a recognition rate for the contents based on at least one of a usage time of the user for each of the contents, number of uses, and number of times in relation to position information at which the contents are used;
wherein the selecting is selecting the contents to be multiplexed using the multiplexing number corresponding to the usage time based on the maximum number and the recognition rate acquired from the determining.

4. The device according to claim 3, further comprising:
updating values for the cumulative usage time, the usage time, the number of uses, and the number of times in relation to the position information at which the contents are used in accordance with the content provided to the user by the providing.

5. The device according to claim 1, wherein the selecting is selecting the contents to be provided to the user based on a priority level set for each of the contents.

6. The device according to claim 1,
wherein the multiplexing is, when sounds are multiplexed as the contents to be provided to the user, sound localization of the contents based on a movement direction and attitude information of the user.

7. An information provision method comprising:
selecting at least one of contents corresponding to position information of a user from the contents stored in a storage unit in advance;

determining a maximum number of the contents on the basis of a cumulative usage time of the user for the contents;

multiplexing, by a computer processor, the at least two of the contents using a multiplexing number of the contents that corresponds with the cumulative usage time of the user to the selected the at least two of the contents, the multiplexing number of the at least two of the contents being selected on the basis of the maximum number of the contents to be multiplexed; and providing the multiplexed contents to the user.

8. The method according to claim 7, wherein the usage time of the user to the contents are corresponding to at least one of usage time to a person providing the contents, usage time to the contents, and usage time to a location from which the content is provided.

9. The method according to claim 7, further comprising:
determining a recognition rate for the contents based on at least one of a usage time of the user for each of the contents, number of uses, and number of times in relation to position information at which the contents are used;
wherein the selecting is selecting the contents to be multiplexed using the multiplexing number corresponding to the usage time based on the maximum number and the recognition rate acquired from the determining.

10. The method according to claim 9, further comprising:
updating values for the cumulative usage time, the usage time, the number of uses, and the number of times in relation to the position information at which the contents are used in accordance with the contents provided to the user by the providing.

11. The method according to claim 7, wherein the selecting is selecting the contents to be provided to the user based on a priority level set for each of the contents.

12. The method according to claim 7, wherein the multiplexing is, when sounds are multiplexed as the contents to be provided to the user, sound localization of the contents based on a movement direction and attitude information of the user.

13. A non-transitory computer-readable storage medium storing an information provision program that causes a computer to execute a process comprising:
selecting at least one of contents corresponding to position information of a user from the contents stored in a storage unit in advance;

determining a maximum number of the contents on the basis of a cumulative usage time of the user for the contents;

multiplexing the contents using a multiplexing number of the contents that corresponds with the cumulative usage time of the user with the selected contents, the multiplexing number of the at least two of the contents being selected on the basis of the maximum number of the contents to be multiplexed; and providing the multiplexed contents to the user.

14. The computer-readable storage medium according to claim 13, wherein the usage time of the user to the contents is corresponding to at least one of usage time a person providing the contents, usage time with the contents, and usage time a location from which the content is provided.

15. The non-transitory computer-readable storage medium according to claim 13, further comprising:
determining a recognition rate for the contents based on at least one of a usage time of the user for each of the contents, number of uses, and number of times in relation to position information at which the contents are used;
wherein the selecting is selecting the contents to be multiplexed using the multiplexing number corresponding to the usage time based on the maximum number and the recognition rate acquired from the determining.

16. The non-transitory computer-readable storage medium according to claim 15, further comprising:
updating values for the cumulative usage time, the usage time, the number of uses, and the number of times in relation to the position information at which the contents are used in accordance with the content provided to the user by the providing.

17. The computer-readable storage medium according to claim 13, wherein the selecting is selecting the content to be provided to the user based on a priority level set for each of the contents.

18. The computer-readable storage medium according to claim 13, wherein the multiplexing is, when sounds are multiplexed as the contents to be provided to the user, sound localization of the contents based on a movement direction and attitude information of the user.

* * * * *